United States Patent
Dodson et al.

(10) Patent No.: US 10,743,379 B2
(45) Date of Patent: Aug. 11, 2020

(54) SYSTEMS AND METHODS FOR LIGHTING CONTROLS AND SENSORS

(71) Applicant: Fluence Bioengineering, Austin, TX (US)

(72) Inventors: Larry Dodson, Austin, TX (US); Randy Johnson, Austin, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

(21) Appl. No.: 16/139,854

(22) Filed: Sep. 24, 2018

(65) Prior Publication Data

US 2019/0098715 A1    Mar. 28, 2019

Related U.S. Application Data

(60) Provisional application No. 62/562,532, filed on Sep. 25, 2017.

(51) Int. Cl.
| | |
|---|---|
| *H05B 33/08* | (2020.01) |
| *H05B 45/10* | (2020.01) |
| *A01G 7/04* | (2006.01) |
| *F21K 9/20* | (2016.01) |
| *H05B 47/10* | (2020.01) |
| *H05B 47/16* | (2020.01) |
| *H05B 47/19* | (2020.01) |

(52) U.S. Cl.
CPC ............ *H05B 45/10* (2020.01); *A01G 7/045* (2013.01); *F21K 9/20* (2016.08); *H05B 47/10* (2020.01); *H05B 47/16* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 9,949,331 B1* | 4/2018 | Coombes | H05B 33/0854 |
| 2011/0133655 A1* | 6/2011 | Recker | H02J 9/02 |
| | | | 315/159 |
| 2018/0238579 A1* | 8/2018 | Bull | F24F 11/46 |
| 2018/0255627 A1* | 9/2018 | Aggarwal | H04W 4/70 |

\* cited by examiner

*Primary Examiner* — Seokjin Kim
(74) *Attorney, Agent, or Firm* — Yutian Ling

(57) ABSTRACT

Examples of the present disclosure are related to systems and methods for lighting controls and sensors. Embodiments described herein may utilize a user interface and/or embedded systems using radio transceivers to allow a user to set-up and control real-time dimming of light fixtures. Furthermore, using the systems, the user may be able to remotely monitor and set-up 24 hour lighting schedules for a plurality of overlapping light fixtures.

11 Claims, 4 Drawing Sheets

SYSTEMS AND METHODS FOR LIGHTING CONTROLS AND SENSORS

CROSS-REFERENCE TO RELATED APPLICATIONS

This application claims a benefit of priority under 35 U.S.C. § 119 to Provisional Application No. 62/562,532 filed on Sep. 25, 2017, which is fully incorporated herein by reference in their entirety.

BACKGROUND INFORMATION

Field of the Disclosure

Examples of the present disclosure are related to systems and methods for hardware and software associated with lighting controls and sensors. More particularly, embodiments disclose hardware and software control solutions for controlling lighting levels of LED fixtures for use within horticulture systems.

Background

Lighting control systems are systems that incorporate communications between various systems inputs and outputs related for lighting controls. Conventionally, lighting control systems are used on both indoor and outdoor lighting of commercial, industrial, and residential spaces. Lighting control systems are generally used to provide the right amount of light when and where the light is needed.

Conventional lighting control systems are employed to maximize energy savings from the lighting systems, comply with conservations programs, and produce efficient harvest of plants. Conventionally, lighting control systems may operate using the temperature inside of a building and/or the photon levels of the lighting to implement a schedule. However, conventional systems do not allow a user to remotely receive data associated with multiple sensor readings within a customer's premise and/or remotely control and schedule the lighting within the customer premise.

Accordingly, needs exist for more effective and efficient systems and methods for lighting controls and sensors that allow a user to remotely control lighting fixtures based on received environmental sensor data.

SUMMARY

Examples of the present disclosure are related to systems and methods for lighting controls and sensors. Embodiments described herein may utilize a user interface and/or embedded systems using wireless transceivers to allow a user to set-up and control real-time dimming of light fixtures. Using the systems, the user may be able to remotely monitor and control lighting schedules for a plurality of overlapping light fixtures, while also receiving real time sensor data associated with the environment at a customer's premise (i.e. greenhouse, indoor horticulture system, outdoor farm, etc.).

Embodiments described herein may utilize a control server that is wirelessly coupled with a control gateway and user interfaces on client computing devices.

The control gateway may be wirelessly coupled with sensor modules and lighting modules located at light fixtures, wherein the sensor modules and lighting modules are physically located at the customer's premise.

The user interfaces on the client computing devices may be configured to receive instructions from a user to remotely change, modify, etc. the lights associated with the light fixtures. More specifically, the client computing devices may be configured to transmit data to the control server associated with control settings for the light fixtures (i.e. schedules, intensity percentages, etc.). The user interfaces may also be configured to present sensor data to the user on the client computing devices. The sensor data may include environmental data within the customer's premise, building, etc., such as temperatures, carbon monoxide, relative humidity, UV-index data, soil moisture readings, pH level data, PAR data, etc.

The control server may be configured to receive and transmit data from the client computing devices and a control gateway. The control server may be configured to receive control data from the client computing devices to change lighting settings associated with the light fixtures, and forward the control data to the control gateway. The control server may be configured to receive sensor data from the control gateway and forward the sensor data to the client computing devices.

In embodiments, the control gateway may a communications bridge that is physically located within the customer's premise. The control gateway may be configured to be wirelessly coupled with the control server, lighting modules, and sensor modules. The control gateway may be configured to communicate with the control server over a first wireless protocol and with the lighting modules and sensor modules over a second wireless protocol. For example, the control gateway may be configured to communicate with the lighting modules and the sensor modules over Bluetooth, BLE mesh, ZigBee, wireless 800/900 MHz, etc.

The modules, including the sensor modules and the lighting modules, may be physically located within the customer's premise, which may be remote from the client computing devices. The lighting modules may be configured to be affixed directly to or remote to light fixtures that are configured to emit light over an area of interest. The sensor modules may be positioned within the ambient environment, soil, and other locations where it would be advantageous to gather data. The lighting modules may be configured to receive control data from the control gateway. Responsive to receiving the control data, the lighting modules may alter settings of the light fixtures, such as emitting light pattern, percentage of light output settings, etc. The sensor modules may be configured to determine environmental data, and transmit the environmental data to the control gateway.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
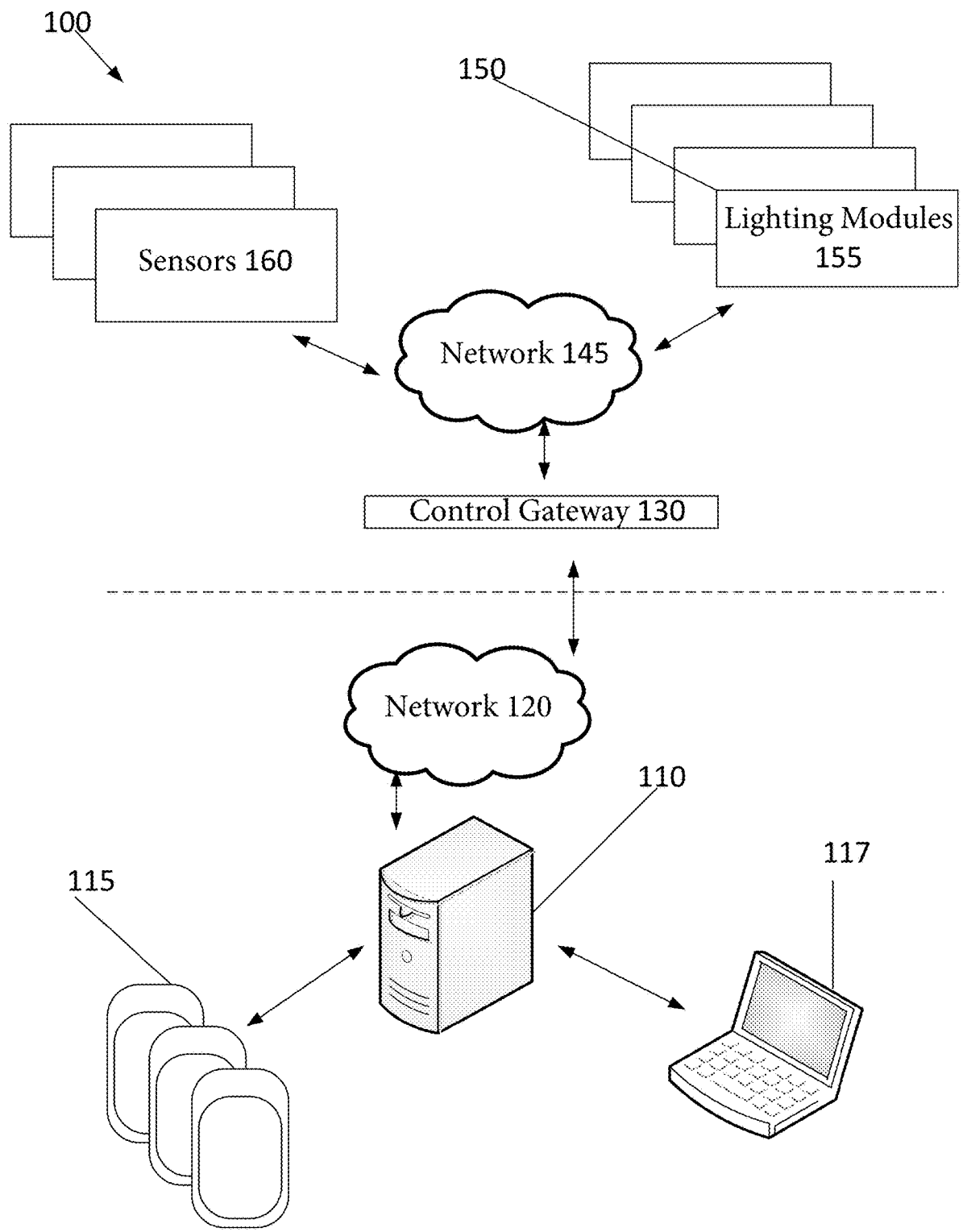
FIG. 1 depicts a system to remotely control lighting modules and sensors, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Turning now to FIG. 1, FIG. 1 depicts a system 100 to remotely control lighting modules and sensors, according to an embodiment. System 100 may include control server 110, client computing devices 115, 117, control gateway 130, lighting modules 155, and sensor modules 160, which are configured to commutate over first network 120 and second network 145.

Control server 110 may be a computing device, such as a general hardware platform server configured to support mobile applications, software, content, and the like executed on client computing devices 115, 117. Control server 110 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Control server 110 may include any combination of one or more computer-usable or computer-readable content. Control server 110 may be configured to receive control data from client computing devices 115, 117, and forward the control data over network 120 to control gateway 130. The control data may be configured to control lighting modules 155 located at a customer's premise. Control server 110 may be configured to receive sensor data from sensor modules 160 via control gateway 130 over network 120. The sensor data may be determined by sensor modules 160 located at the customer's premise.

Client computing devices 115, 117 may be a smart phone, tablet computer, desktop computer, laptop computer, wearable computer, personal data assistant, or any other type of computing device with a hardware processor that is configured to process instructions and connect to control server 110. Client computing devices 115, 117 may include graphical user interfaces that are configured to allow a user to be presented with data, and allow the user to transmit data. For example, the graphical user interface may be a mobile application, web application, software configured to run on a browser, etc. In embodiments, when a user utilizes the graphical user interface the user may perform actions to transmit a grouping command to the control gateway, wherein the grouping command groups a set of light fixtures. Specifically, the grouping command may be a timer, wherein any light fixtures that are initialized during a predetermined time period, time window, duration, etc., such as within the next fifteen minutes, will be automatically registered to a selected group.

First network 120 may be a wired or wireless network such as the Internet, an intranet, a LAN, a WAN, a cellular network, or another type of network. It will be understood that first network 120 may be a combination of multiple different kinds of wired or wireless networks.

Control gateway 130 may be a computing device that is physically located at the customer's premise. Control gateway 130 may be configured to be communicatively coupled with control server 110, and to lighting modules 155 and sensor modules 160 over network 145. Control gateway 130 may be a communications bridge that is configured as a data-link between different elements within system 100. For example, control gateway 130 may be configured to communicate to control server 110 over an internet protocol, and communicate with lighting modules 155 and sensor modules 160 over Wi-Fi, Bluetooth, etc.

Second network 145 may be a wireless network that is configured to transmit data over a short distance. For example, second type of network may be Bluetooth, Zigbee, Wi-Fi, mesh network, radio, etc. Second network 145 may be configured to allow for local transmission of control data and sensor data at the customer's premise.

Lighting modules 155 may include light fixtures and modules configured to communicate sensor data and control data, wherein lighting modules 155 may be physically located at the light fixtures. In embodiments, each lighting module 155 may be given a unique identifier, such as a string of alphanumerical characters, which are utilized to identify the specific lighting module 155. Utilizing the unique identifiers, lighting modules 155 may be grouped together in different lighting groups. For example, lighting groups may be assigned to a given room, floor, section of a greenhouse, etc. Different lighting modules 155 may be grouped together in groupings of various sizes. The grouped light fixtures may be configured to operate with the same or substantially similar lighting controls, which may reduce the number of steps required to control the lighting and/or environment within a customer's premise. In further embodiments, lighting modules 155 may be different types of light fixtures, wherein a first lighting module 155 is a first type of light fixture that is optimized to control emitted light over an area of interest and a second lighting module 155 is a second type of light fixture is optimized to control heat generated by the second type of light fixture. Lighting modules 155 may be configured to receive control data to dynamically change light emissions associated with the light fixture, program a lighting schedule, transmit data associated with the lighting fixture, etc.

Lighting modules 155 may include a processing device, communication device, memory device, light sources, and lighting controls 150.

The processing device may include memory, e.g., read only memory (ROM) and random access memory (RAM), storing processor-executable instructions and one or more processors that execute the processor-executable instructions. In embodiments where the processing device includes two or more processors, the processors may operate in a parallel or distributed manner. For example, the processing device may be configured to implement lighting controls and/or a schedule responsive to receiving control data from control gateway 130.

The communication device may be a hardware processing device that allows a lighting module 155 to communicate with another device over second network 145. The communication device may include one or more wireless transceivers for performing wireless communication and/or one or more communication ports for performing wired communication. In implementations, the communication device may be configured to communicate data over a plurality of different standards and/or protocols. For example, the communications device may be configured to receive control data from control gateway 130 to change the settings of the light fixture.

The memory device may be a device that stores data generated or received by lighting modules 155. The memory device may include, but is not limited to a hard disc drive, an optical disc drive, and/or a flash memory drive. In embodiments, the memory device may be configured to store control data to implement lighting controls 150.

The light source may be an artificial light source that is configured to stimulate plant growth by emitting light. For example, the light source may be LEDs. The light source may be utilized to create light or supplement natural light to the area of interest. The light source may provide a light spectrum that is similar to the sun, or provide a spectrum that is tailored to the needs of particular pants being cultivated.

The lighting controls 150 may be configured to control the light sources on a lighting module 155 and/or a group of lighting modules 155. For example, the lighting controls 150 may be configured to implement a clock time to initiate/turn on the light sources, a clock time to turn off the light sources, ramp-up and ramp-down times to turn on or turn off the light sources, light level percentages during the various time segments, etc.

Sensor modules 160 may include sensors that are configured to determine and communicate sensor data. Sensor modules 160 may be positioned on the various lighting modules 155 and/or any location within the customer's premise, including: within the ambient environment, within the soil, on the soil, at a lighting fixture, etc. Each sensor module 160 may include a unique identifier, such that an individual sensor and corresponding location may be determined. Each sensor module 160 may include a processing device, communication device, memory device, light sources, and lighting controls 150.

The processing device may include memory, e.g., read only memory (ROM) and random access memory (RAM), storing processor-executable instructions and one or more processors that execute the processor-executable instructions. In embodiments where the processing device includes two or more processors, the processors may operate in a parallel or distributed manner. For example, the processing device may be configured to determine a schedule of when to obtain sensor data from sensor modules 160.

The communication device may be a hardware processing device that allows sensor modules 160 to communicate with another device over second network 145. The communication device may include one or more wireless transceivers for performing wireless communication and/or one or more communication ports for performing wired communication. In implementations, the communication device may be configured to communicate data over a plurality of different standards and/or protocols. For example, the communications device may be configured to transmit sensor data to control gateway 130.

The memory device may be a device that stores data generated or received by sensor modules 160. The memory device may include, but is not limited to a hard disc drive, an optical disc drive, and/or a flash memory drive. In embodiments, the memory device may be configured to store sensor data that is obtained by sensor modules 160. In embodiments, the memory device may be configured to store a data record associated with each sensor module 160. The data record may include captured data from sensors associated with daily light levels at given times via timestamps, data categorized to customer's crop and grow cycles, analytics, etc.

The sensor may be configured to determine sensor data associated with temperature, RH values, pH values, $CO_2$ values, moisture values, Photosynthetically Active Radiation (PAR) values, energy consumption (watts) by a lighting module 155, determine a power level of the lighting fixtures in use based on light level settings with actual PAR values, etc. The sensor data may be configured to be displayed at a graphical user interface on client computing devices 115, 117.

In implementations, control gateway 130 may be configured to automatically group lighting modules 155 and/or sensors modules 160 together, which may be completed upon initialization, before installation at the customer premise, and/or after use. In embodiments, control gateway 130 may be configured to automatically group lighting modules 155 and/or sensors modules 160 together through a pairing request that is triggered by a specific request from a user on the user interfaces to generate a bond between control gateway 130 and lighting modules 155 and/or sensors modules 160 that are in range of second network 145.

In other implementations, the pairing request may be triggered automatically upon lighting modules 155 and/or sensor modules 160 initializing and transmitting their corresponding unique identifiers over second network 145 to control gateway 130. Accordingly, upon initialization lighting modules 155 and/or sensors modules 160 may broadcast their unique identifiers over second network 145, such as utilizing a radio frequency protocol.

Control gateway 130 may be configured to receive a grouping command from the client computing devices 115, 117 to form a group of lighting modules 155 and/or sensors 160. Control gateway may form a grouping of light modules 155 and/or sensors 160 based on unique identifiers that are received during a given time period after receiving the grouping command from the client computing devices 115, 117. In some embodiments, a group of light fixtures may include a unique group identifier that is utilized to simultaneously control each lighting module 155 and/or sensor 160 within a group, wherein the unique group identifier is transmitted to control server 110 by the client computing devices 115, 117 along with a command. Responsive to receiving a unique identifier from a lighting module 155 and/or sensor 160, control gateway 130 may transmit a link key back to the lighting module 155 and/or sensor 160 to automatically pair the control gateway 130 and lighting modules 155 and/or sensor 160. In further implementations, different groupings of lighting modules 155 and/or sensor modules 160 may be manually created by a user performing actions on a client computing device 115, 117, such as a user typing the unique identifiers of the desired light modules 155 and/or sensors 160 within an interface to form a group, or scanning QR codes, bar codes, or other identifiers that are associated with the unique identifiers of the light modules 155 and/or sensors 160.

Figure 2:
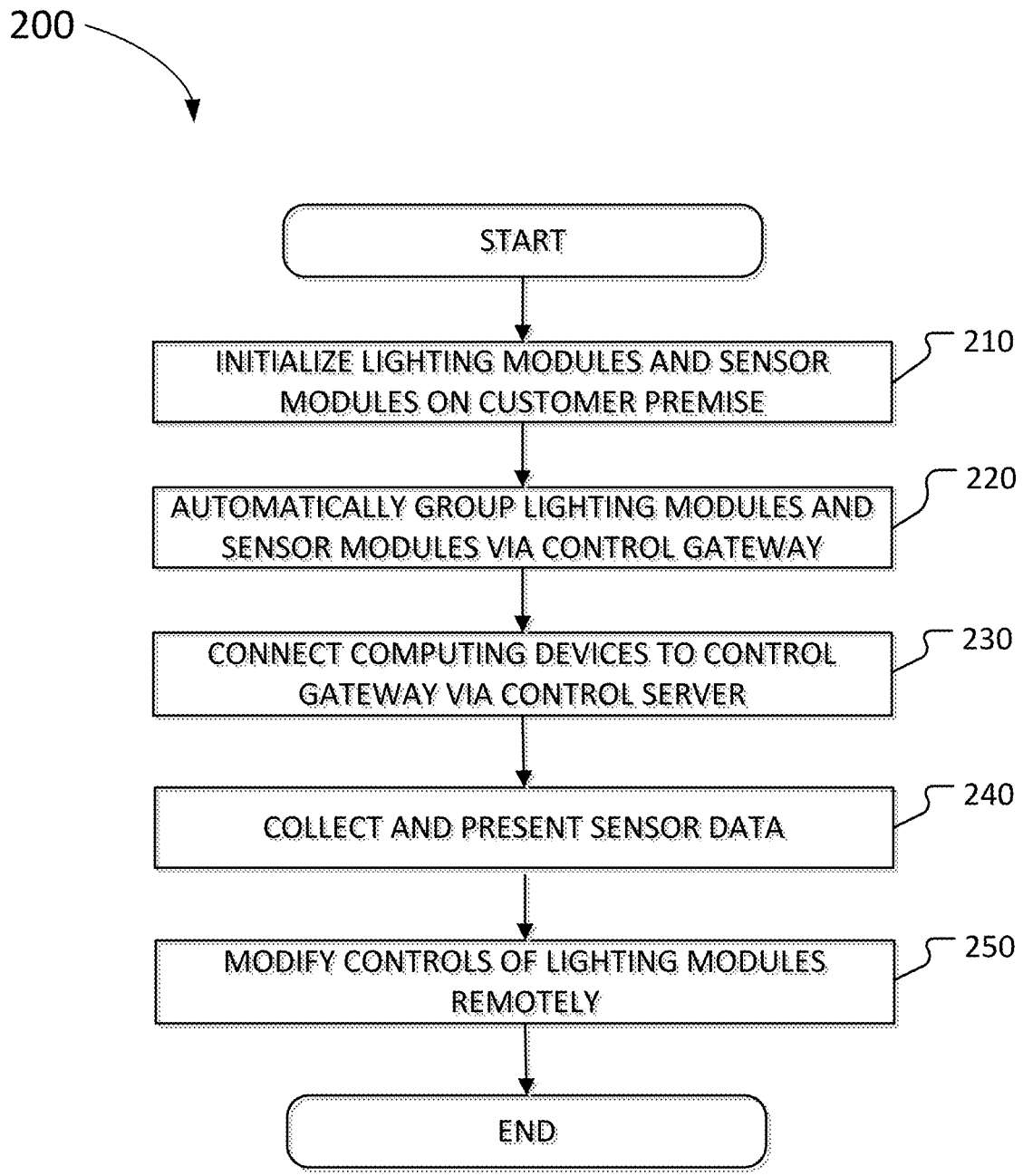
FIG. 2 depicts a method for remotely controlling lighting modules and sensors, according to an embodiment.

FIG. 2 depicts a method 200 for remotely controlling lighting modules and sensors, according to an embodiment. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

At operation 210, lighting modules and sensor modules may be installed at a customer's premise.

At operation 220, the lighting modules and sensor modules may be automatically grouped together via a control gateway located at the customer's premise. The lighting modules and sensor modules may be automatically paired and grouped with the control gateway responsive to the lighting modules and sensor modules being initialized.

At operation 230, client computing devices may be configured to be wirelessly connected to the lighting modules and sensor modules by via a control server that is connected to the first gateway over a first type of network.

At operation 240, the client computing devices may receive data associated with the lighting modules and the sensor modules.

At operation 250, the client computing device may modify controls of the lighting modules by interacting with a user interface on the client computing device. Responsive to the user interacting with the user interface, the client computing device may transmit control data to control server that forwards the control data to the control gateway, which broadcasts the control data to the corresponding grouping of lighting modules and/or sensor modules.

Figure 3:
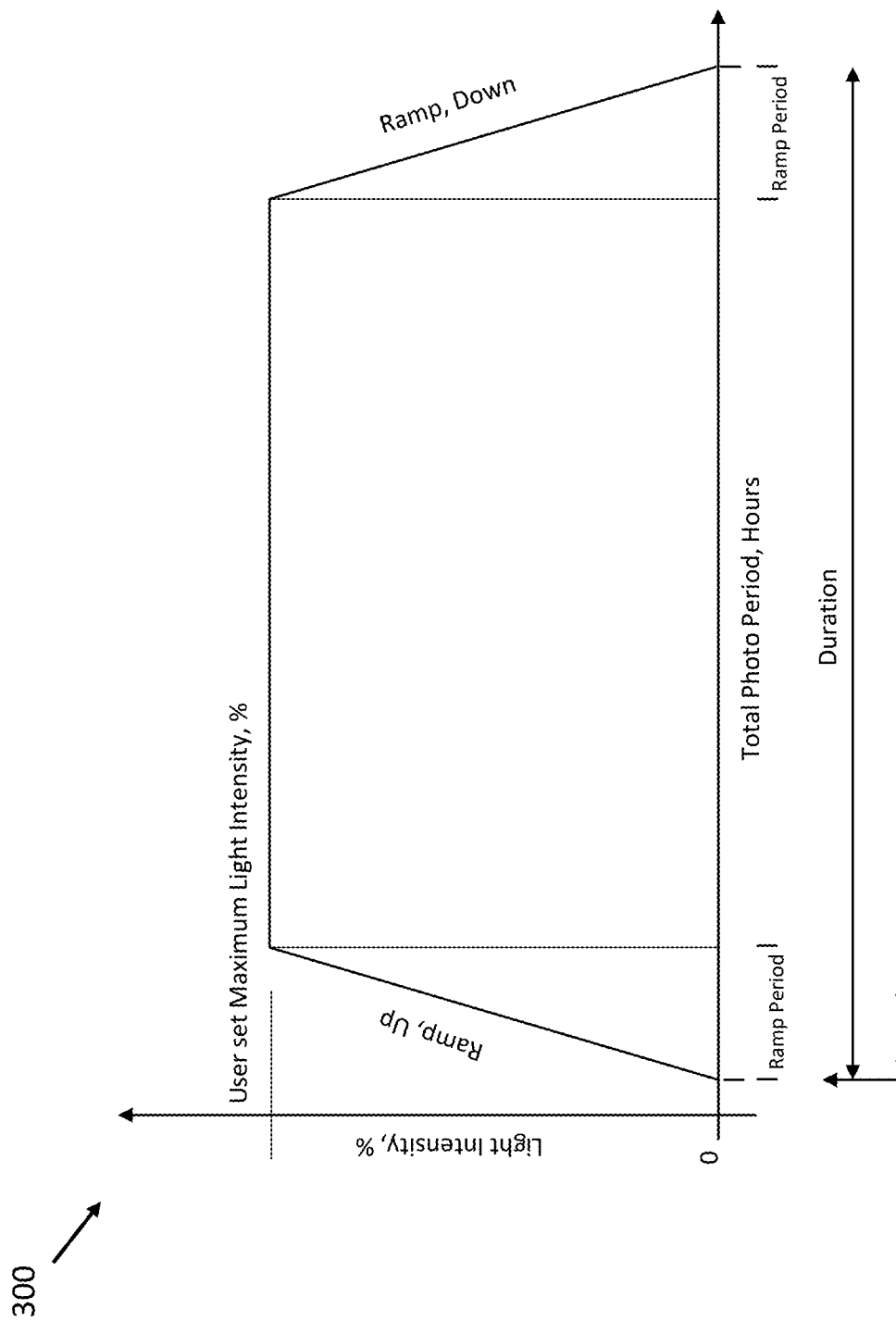
FIG. 3 depicts a lighting schedule configured to be implemented by a lighting module and/or group of lighting modules, according to an embodiment.

FIG. 3 depicts a lighting schedule 300 configured to be implemented by a lighting module 155 and/or group of lighting modules 155. Elements depicted in FIG. 3 may be substantially described above. For the sake of brevity, another description of these elements is omitted.

As depicted in FIG. 3, a light schedule may have a ramp up period, a photo period, and a ramp down period. During the ramp up period, the light intensity percentage associated with the light source may increase. During the photo period, the light intensity percentage associated with the light source may be substantially constant. During the ramp down period, the light intensity percentage associated with the light source may decrease. In embodiments, each factor associated with these time periods and light intensity percentages can be programmed by an end user. For example, the duration of each period may be altered, as well as the light intensity percentages.

Figure 4:
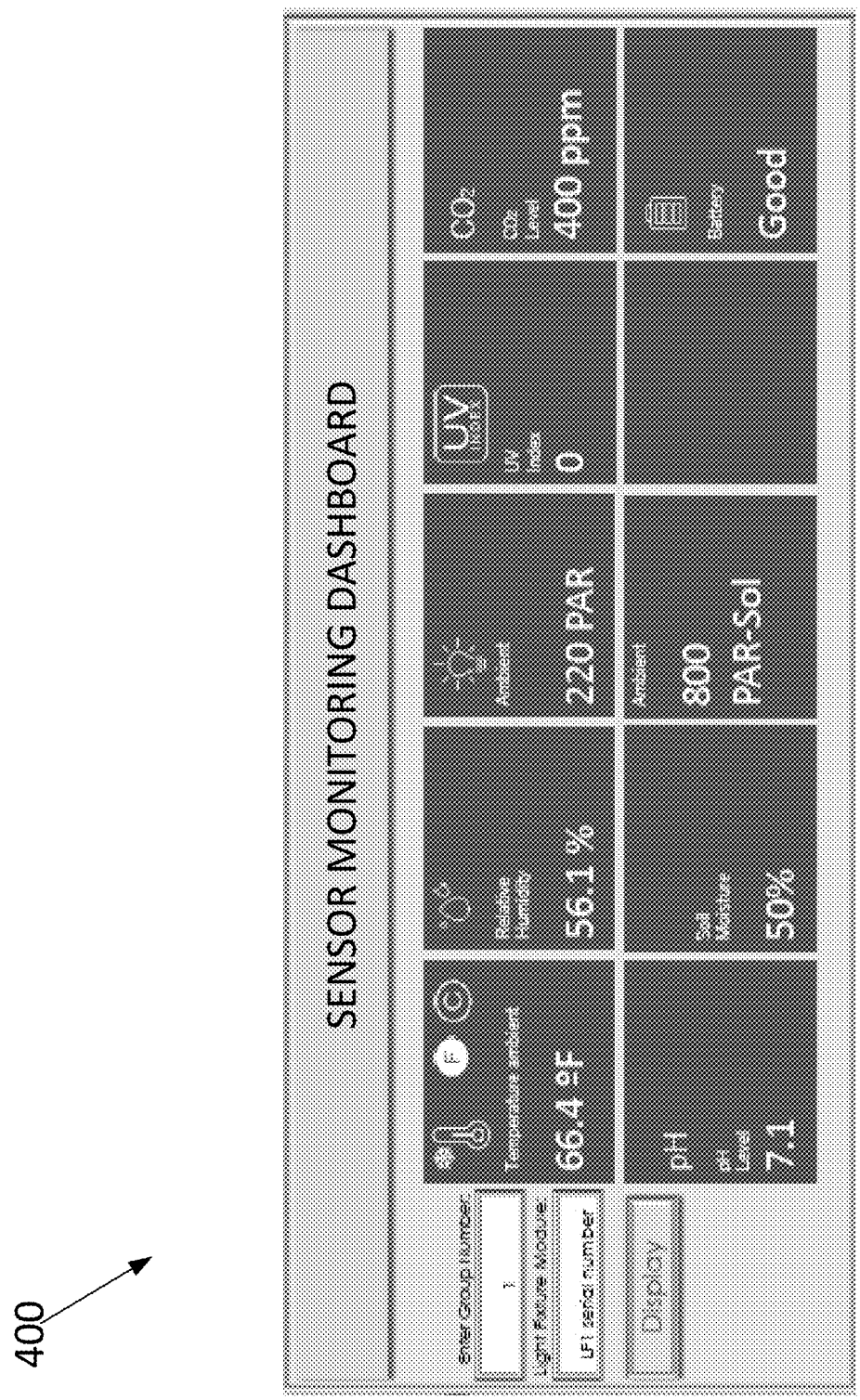
FIG. 4 depicts a dashboard that may be presented on a client computing device, according to an embodiment.

FIG. 4 depicts a dashboard 400 that may be presented on a client computing device, according to an embodiment. Elements depicted in FIG. 4 may be substantially described above. For the sake of brevity, another description of these elements is omitted.

As depicted in FIG. 4, a graphical user interface on a client computing device may present real time sensor values to a user. The graphical user interface may include a group associated with a sensor and/or a light fixture, as well as a unique identifier associated with the sensors and/or the lighting module. Utilizing the graphical user interface, a user may view the sensor data, and transmit control data to change lighting controls associated with a lighting module. By changing the lighting controls associated with a lighting module, the user may cause changes to the sensor data.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A system to remotely control lighting devices comprising:
 a plurality of lighting modules corresponding to a plurality of light fixtures, wherein each lighting module has a fixture unique identifier;
 a plurality of sensor modules configured to determine environmental data, and to transmit the environmental data to a control gateway over a second type of network; and
 the control gateway, communicatively coupled to a control server over a first type of network and to the plurality of lighting modules and the plurality of sensor modules over the second type of network, the control gateway configured to:

assign groupings of the plurality of lighting modules and the plurality of sensor modules, wherein each grouping comprises at least one of the plurality of lighting modules and at least one of the plurality of sensor modules;

receive user input over the first type of network specifying a light schedule for a first grouping of lighting modules and sensor modules, wherein the light schedule comprises a ramp up period, a photo period for illuminating plants at a substantially constant light intensity, and a ramp down period; and transmit the light schedule over the second type of network to the first grouping to implement the light schedule, wherein the control server is positioned remotely from the control gateway and the plurality of lighting modules.

2. The system of claim 1, wherein the control server is communicatively coupled to a plurality of client computing devices.

3. The system of claim 1, wherein the control gateway is configured to independently control each of the plurality of lighting modules based on the corresponding fixture unique identifier.

4. The system of claim 1, wherein the first type of network is configured to allow for a larger range of transmission than the second type of network.

5. The system of claim 1, where the plurality of light fixtures are different type of light fixtures that are configured to emit different light patterns.

6. A method to remotely control lighting devices comprising:

positioning a plurality of lighting modules corresponding to a plurality of light fixtures within a location, wherein each lighting module has a fixture unique identifier;

assigning, by a control gateway, groupings of the plurality of lighting modules and a plurality of sensor modules, wherein each grouping comprises at least one of the plurality of lighting modules and at least one of the plurality of sensor modules;

communicatively coupling the control gateway to a to a control server over a first type of wireless network;

communicatively coupling the control gateway to the plurality of lighting modules over a second type of network;

receiving, at the control gateway, user input over the first type of network specifying a light schedule for a first grouping of lighting modules and sensor modules, wherein the light schedule comprises a ramp up period, a photo period for illuminating plants at a substantially constant light intensity, and a ramp down period; and transmitting, by the control gateway, the light schedule over the second type of network to the first grouping to implement the light schedule, wherein the control server is positioned remotely from the control gateway and the plurality of lighting modules.

7. The method of claim 6, further comprising:

determining environmental data by the plurality of sensor modules;

transmitting the environmental data to the control gateway over the second type of network.

8. The method of claim 6, wherein the control server is communicatively coupled to a plurality of client computing devices.

9. The method of claim 6, wherein the control gateway is configured to independently control each of the plurality of lighting modules based on the corresponding fixture unique identifier.

10. The method of claim 6, wherein the first type of network is configured to allow for a larger range of transmission than the second type of network.

11. The method of claim 6, where the plurality of light fixtures are different type of light fixtures that are configured to emit different light patterns.

* * * * *